(12) United States Patent
Ikegami et al.

(10) Patent No.: US 12,163,037 B2
(45) Date of Patent: Dec. 10, 2024

(54) AQUEOUS INK, INK CARTRIDGE AND INK JET RECORDING METHOD

(71) Applicant: CANON KABUSHIKI KAISHA, Tokyo (JP)

(72) Inventors: Masayuki Ikegami, Kanagawa (JP); Masashi Yamamoto, Tokyo (JP); Yoko Taira, Kanagawa (JP); Tomoaki Ishii, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 471 days.

(21) Appl. No.: 17/129,466

(22) Filed: Dec. 21, 2020

(65) Prior Publication Data
US 2021/0198508 A1    Jul. 1, 2021

(30) Foreign Application Priority Data

Dec. 26, 2019  (JP) .................. 2019-237558
Dec. 26, 2019  (JP) .................. 2019-237559
Dec. 10, 2020  (JP) .................. 2020-204754

(51) Int. Cl.
C09D 11/38    (2014.01)
B41M 5/00     (2006.01)
C08K 3/08     (2006.01)
C08K 5/053    (2006.01)
C08K 5/06     (2006.01)
(Continued)

(52) U.S. Cl.
CPC ........... C09D 11/38 (2013.01); B41M 5/0023 (2013.01); C08K 3/08 (2013.01); C08K 5/053 (2013.01); C08K 5/06 (2013.01); C08K 5/09 (2013.01); C09D 11/033 (2013.01); C08K 2003/0806 (2013.01)

(58) Field of Classification Search
CPC ....... C09D 11/38; C09D 11/033; C09D 11/14; C09D 11/322; B41M 5/0023; C08K 3/08; C08K 5/053; C08K 5/06; C08K 5/09; C08K 2003/0806
See application file for complete search history.

(56) References Cited

U.S. PATENT DOCUMENTS 9,593,250 B2 *  3/2017  Mizutani .......... C09B 67/0085
2011/0151110 A1 * 6/2011  John ................... H05K 1/097
                                              977/773
(Continued)

FOREIGN PATENT DOCUMENTS

JP    2002088286 A  *  3/2002
JP    2004202964 A  *  7/2004
(Continued)

OTHER PUBLICATIONS

English Machine Translation of JP2002088286A ("Machine Translation_Goto_JP_2002088286_A") (Year: 2002).*
(Continued)

Primary Examiner — Jennifer A Smith
Assistant Examiner — Jeffrey Eugene Barzach
(74) Attorney, Agent, or Firm — Canon U.S.A., Inc. I.P. Division

(57) ABSTRACT

An aqueous ink for an ink jet including a silver particle that contains (i) a first organic monocarboxylic acid having a pKa of 4.60 or more and (ii) a second organic monocarboxylic acid having a pKa of less than 4.60 and having a carbon number of 2 or less.

19 Claims, 2 Drawing Sheets

(51) Int. Cl.
*C08K 5/09* (2006.01)
*C09D 11/033* (2014.01)

(56) References Cited

U.S. PATENT DOCUMENTS

2012/0238706 A1* 9/2012 Graichen ........... C08G 18/4213
　　　　　　　　　　　　　　　　　　　525/437
2018/0333970 A1* 11/2018 Iida ..................... B41J 2/2114
2022/0204801 A1* 6/2022 Yoshida ................. C09D 11/52

FOREIGN PATENT DOCUMENTS

| JP | 2009074171 | A | * | 4/2009 |
| JP | 2009227736 | A | * | 10/2009 |
| JP | 2009238625 | A | * | 10/2009 |
| JP | 2010229544 | A | * | 10/2010 |
| JP | 2011241242 | A |   | 12/2011 |
| JP | 2012121279 | A |   | 6/2012 |
| JP | 2014033176 | A |   | 2/2014 |
| JP | 2016079390 | A | * | 5/2016 | ......... C08G 18/0823 |
| JP | 2018075828 | A |   | 5/2018 |
| JP | 2018090719 | A |   | 6/2018 |
| JP | 2018104681 | A | * | 7/2018 |
| JP | 2019189717 | A | * | 10/2019 |

OTHER PUBLICATIONS

English Machine Translation of JP2009238625A ("Machine_Translation_Ochi_JP_2009238625_A") (Year: 2009).*
English Machine Translation of JP2009074171A ("Machine_Translation_Iseda_JP_2009074171_A") (Year: 2009).*
English Machine Translation of JP2018104681A (Year: 2018).*
English Machine Translation of JP2010229544A (Year: 2010).*
English machine translation of JP-2016079390-A (Year: 2016).*
English machine translation of JP-2009227736-A (Year: 2009).*
English machine translation of JP-2004202964-A (Year: 2004).*
English machine translation of JP-2019189717-A (Year: 2019).*

* cited by examiner

AQUEOUS INK, INK CARTRIDGE AND INK JET RECORDING METHOD

BACKGROUND OF THE INVENTION

Field of the Invention

The present disclosure relates to an aqueous ink, an ink cartridge and an ink jet recording method.

DESCRIPTION OF THE RELATED ART

Ink containing a metal particle has been used to form an electric circuit by exploiting electronic conductivity of the metal particle used and, in recent years, has also been applied to, for example, Christmas greeting cards having a metallic appearance. In such usage, it is desirable to record an image having a metallic appearance (hereafter also referred to as a "metallic image") to enhance decorativeness of the image. For the purpose of recording a metallic image, an aqueous ink containing a silver particle and various components serving as a pH adjuster has been proposed (refer to Japanese Patent Laid-Open No. 2011-241242 and Japanese Patent Laid-Open No. 2018-075828). In addition, an aqueous ink containing a silver particle and a resin particle has been proposed (refer to Japanese Patent Laid-Open No. 2018-090719).

The present inventors performed research on an ink containing a silver particle in the related art. As a result, it was found that the inks described in Japanese Patent Laid-Open No. 2011-241242 and Japanese Patent Laid-Open No. 2018-075828 have favorable storage stability but it takes time until abrasion resistance is realized to some extent after application to a recording medium; that is, abrasion resistance immediately after recording of a metallic image is insufficient. Meanwhile, it was found that regarding the ink described in Japanese Patent Laid-Open No. 2018-090719, abrasion resistance immediately after recording of a metallic image is insufficient and, in addition, storage stability is insufficient.

SUMMARY OF THE INVENTION

The present disclosure provides an aqueous ink having excellent storage stability and enabling an image having abrasion resistance that is realized in a short time after application of the ink to be recorded and provides an ink cartridge using the aqueous ink and an ink jet recording method.

Accordingly, the present disclosure provides an aqueous ink enabling an image having abrasion resistance that is realized in a short time after application of the ink and having excellent storage stability to be recorded and provides an ink cartridge using the aqueous ink and an ink jet recording method.

Further features of the present disclosure will become apparent from the following description of exemplary embodiments with reference to the attached drawings.

BRIEF DESCRIPTION OF THE DRAWINGS

FIG. 2A is a perspective view illustrating a main portion of the ink jet recording apparatus, and FIG. 2B is a perspective view illustrating a head cartridge.

DESCRIPTION OF THE EMBODIMENTS

Figure 1:
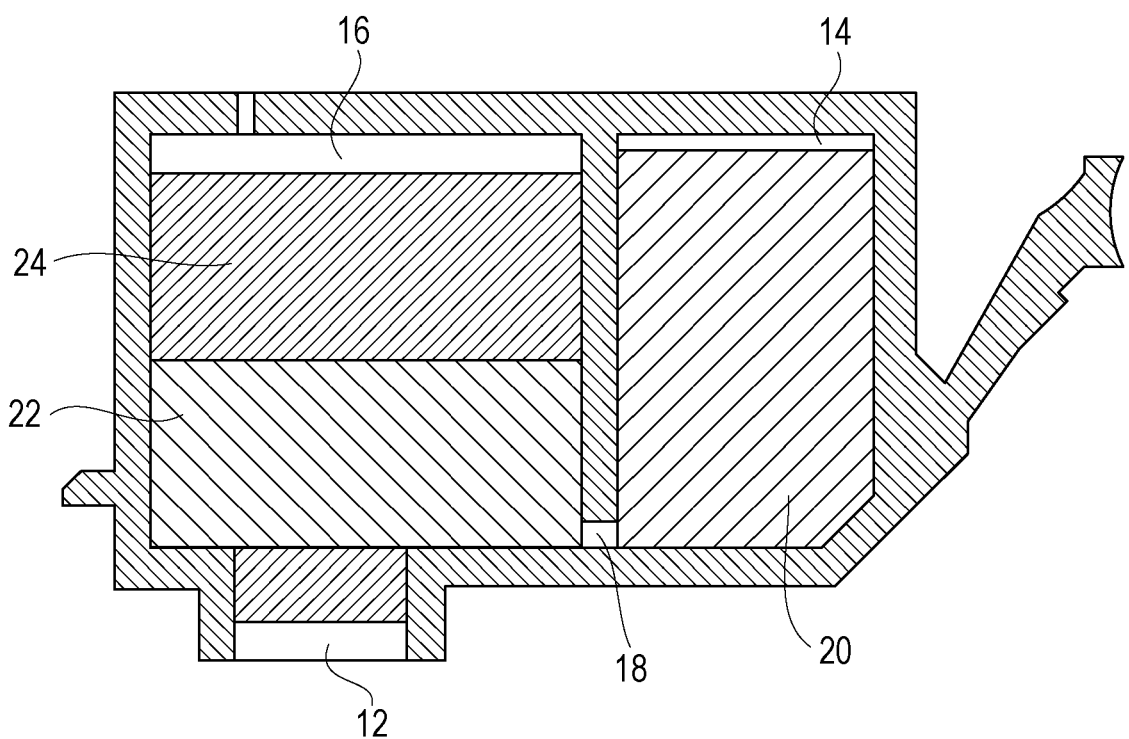
FIG. 1 is a schematic sectional view illustrating an embodiment of an ink cartridge according to the present disclosure.

The present disclosure will be described below in further detail with reference to the embodiment. In the case in which a compound is a salt in the present disclosure, the salt dissociates into ions in an ink, and this state is expressed as an ink containing a salt for the sake of convenience in the present disclosure. In addition, an aqueous ink for an ink jet may be simply referred to as "ink". Physical property values are values at normal temperature (25° C.) unless otherwise specified.

A metallic image recorded by using an ink containing a silver particle has a layer structure in which a silver layer is formed on a recording medium. Since the silver layer formed of the silver particle has a metallic luster appearance, the resulting metallic image has glossiness. A silver particle used for an ink jet ink usually have a particle size of several tens to several hundreds of nanometers from the viewpoint of ejection properties. A silver particle having such a particle size causes surface plasmon resonance so as to realize a color tone different from achromatic silver. However, since the silver particle agglomerated on the recording medium do not readily causes surface plasmon resonance, a silver layer formed by agglomeration takes on an achromatic silver color tone.

In general, a recording medium used for recording a metallic image contains a halide ion such as a chloride ion ($Cl^-$). For example, a recording medium not having an ink-receiving layer such as plain paper contains a chloride ion derived from a bleaching agent for pulp. Meanwhile, a recording medium having an ink-receiving layer contains a cationic compound such as a resin, a counter ion of which includes a chloride ion. The halide ion is involved in agglomeration of the silver particle. When an aqueous ink containing a silver particle is applied to such a recording medium, a liquid component constituting the ink permeates the recording medium. The halide ion contained in the recording medium is dissolved into the liquid component and some halide ions diffuse to the vicinity of the surface of the recording medium. Since halide ion readily reacts with silver, a silver halide is generated on the surface of the silver particle, a plurality of silver particles are bonded to each other with a silver halide therebetween so as to form a strong silver layer. That is, agglomeration of the silver particle being facilitated by the halide ion enables abrasion resistance of a metallic image to be improved.

However, in accordance with a recording medium, several hours were required until a strong silver layer was formed after the ink was applied, and abrasion resistance after a metallic image was recorded became insufficient in a short time, such as several minutes. As a result of research by the present inventors, it was found that such a phenomenon tends to occur when a recording medium having a low halide ion content is used. In particular, since it takes time for the halide ion to diffuse to the vicinity of the surface of the recording medium after the ink is applied, the abrasion resistance after the ink is applied becomes insufficient in a short time because the silver particle is not promptly agglomerated.

The present inventors performed research to improve abrasion resistance immediately after a metallic image was recorded regardless of the content of the halide ion in a recording medium by reducing the time required for a strong silver layer to form after an ink was applied. As a result, it was found that addition of both (i) a first organic monocarboxylic acid having a pKa of 4.60 or more and (ii) a second organic monocarboxylic acid having a pKa of less than 4.60 and having a carbon number of 2 or less to the ink containing a silver particle was effective. The pKa (acid dissociation constant) is an indicator which quantitatively represents the strength of an acid and is a constant intrinsic to a compound. The pKa is a negative common logarithm of the equilibrium constant Ka of a dissociation reaction in which a hydrogen ion is released from a compound such as an acid (pKa=−$\log_{10}$Ka), and a smaller pKa indicates a stronger acid.

As described above, a recording medium contains the halide ion. In this regard, a recording medium not having an ink-receiving layer such as plain paper contains a cationic compound such as a filler, for example, calcium carbonate, and a recording medium having an ink-receiving layer contains a cationic compound such as a resin, the counter ion of which includes a chloride ion. Each of the cationic compounds is weakly basic, and at least some cationic compounds are contained in the recording medium while being in the state of ionically interacting with the halide ion. When the ink containing a silver particle and the first organic monocarboxylic acid is applied to the recording medium, the weakly acidic first organic monocarboxylic acid selectively reacts with the weakly basic cationic compound (weak acid-weak base neutralization reaction) so as to form a salt. Consequently, compared with the case in which the first organic monocarboxylic acid is not used, a large amount of strong acid halide ion is isolated, and the amount of the halide ion that diffuses to the vicinity of the surface of the recording medium increases. As a result, agglomeration of the silver particle by the halide ion is facilitated, and a strong silver layer is promptly formed. Therefore, the abrasion resistance immediately after a metallic image is recorded is readily improved.

The present inventors performed research on the pKa range, in which such an effect was exerted, of the organic monocarboxylic acid. As a result, the first organic monocarboxylic acid having a pKa of 4.60 or more was found to be useful. Using an organic monocarboxylic acid having a pKa of less than 4.60 does not cause the above-described weak acid-weak base neutralization reaction, and the abrasion resistance immediately after a metallic image is recorded is not improved.

As described above, using the first organic monocarboxylic acid facilitates agglomeration of the silver particle by the halide ion, and the abrasion resistance immediately after a metallic image is recorded is readily improved. However, research by the present inventors revealed a case in which such an effect was not exerted in some times. The recording medium contains a polyvalent metal ion regardless of the type of the recording medium. When an ink containing the first organic monocarboxylic acid was applied to the recording medium, some of the first organic monocarboxylic acid was captured by the polyvalent metal ion, and there was a case in which the effect of facilitating isolation of the halide ion was not exerted. In consideration of such a phenomenon, the present inventors performed research to reliably realize the effect of the first organic monocarboxylic acid. As a result, using the first organic monocarboxylic acid and the second organic monocarboxylic acid having a pKa of less than 4.60 and having a carbon number of 2 or less in combination was found to be effective.

The second organic monocarboxylic acid readily diffuses because of high water solubility and compact molecules. Consequently, the second organic monocarboxylic acid is more preferentially captured, by a calcium ion, than the first organic monocarboxylic acid and has a pKa of less than 4.60 so as to enable the effect of the first organic monocarboxylic acid to be exerted without being impaired. That is, using the first organic monocarboxylic acid and the second organic monocarboxylic acid in combination enables the abrasion resistance immediately after a metallic image is recorded to be effectively improved.

As described above, the organic monocarboxylic acid added to the ink has to be a "monocarboxylic acid" having a single carboxylic acid group. When an organic polyvalent carboxylic acid is used instead of the organic monocarboxylic acid, an effect of coordinating with a silver ion becomes dominant. In this case, since a selective reaction with the cationic compound contained in the recording medium does not readily occur, abrasion resistance immediately after a metallic image is recorded is not improved. Meanwhile, even when an organic sulfonic acid is used instead of the organic monocarboxylic acid, since the above-described weak acid-weak base neutralization reaction does not occur, abrasion resistance immediately after a metallic image is recorded is not improved.

Using the first organic monocarboxylic acid enables not only abrasion resistance immediately after a metallic image is recorded to be improved but also an effect of improving ink storage stability to be obtained.

In the ink, a silver atom constituting a silver particle is in a state of equilibrium with the silver ion. That is, giving and receiving of electrons is performed between a silver particle and the silver ion. An electron that moves from the silver atom may move to an oxygen gas dissolved in the ink rather than to other silver atom so as to generate active oxygen. Active oxygen has strong oxidizing power and may oxidize some silver atoms present on the silver particle surface. It is conjectured that if an oxidized portion and an unoxidized portion are present in the silver particle surface, a state of electric charge distribution on the silver particle surface becomes nonuniform so as to cause agglomeration of the silver particle, and ink storage stability deteriorates. It is conjectured that the silver particle, even when in a state of being dispersed by a dispersant, is agglomerated due to oxidation of not only silver atoms but also the dispersant by active oxygen generated as above, and the ink storage stability deteriorates. Generation of active oxygen is a phenomenon intrinsic to an ink in which a coloring material is a silver particle, and the storage stability of the ink containing a silver particle particularly tends to deteriorate compared with an ink containing a common coloring material such as a dye or a pigment.

When the first organic monocarboxylic acid is added to the ink containing a silver particle, even if the silver ion is generated, carboxylic acid groups of the first organic monocarboxylic acid coordinate with the silver ion so as to supply electrons to the silver ion. Consequently, the silver ion is unable to receive electrons from a silver particle, and the frequency of occurrence of giving and receiving of electrons between a silver particle and the silver ion is reduced. Therefore, it is conjectured that active oxygen is thereby not readily generated and that, as a result, the silver particle is suppressed from agglomerating so as to improve the ink storage stability. According to research, the effect of the first organic monocarboxylic acid on the improvement of the ink storage stability is predominant over the effect of the second organic monocarboxylic acid. The pKa of the second organic monocarboxylic acid is lower than that of the first organic monocarboxylic acid, therefore the second organic monocarboxylic acid is more stable as an ion than the first organic monocarboxylic acid in aqueous ink. Therefore, it is considered that the second organic monocarboxylic acid is less likely to coordinate with the silver ion than the first organic monocarboxylic acid, and as a result, the effect of suppressing the generation of active oxygen is weak.

Aqueous Ink

The ink according to the present disclosure is an aqueous ink containing (i) the first organic monocarboxylic acid having a pKa of 4.60 or more; and (ii) the second organic monocarboxylic acid having a pKa of less than 4.60 and having a carbon number of 2 or less. This aqueous ink is suitably used for an ink jet. In this regard, the ink according to the present disclosure does not have to be an active-energy-ray-curable type and, therefore, does not have to contain, for example, a monomer having a polymerizable group. Components that constitute the aqueous ink will be described below.

Silver Particle

A silver particle is composed of silver atoms. A silver particle may be configured to contain metal atoms other than silver atoms, oxygen atoms, sulfur atoms and carbon atoms in addition to silver atoms. However, the proportion (%) of silver atoms in a silver particle is preferably 50.0% by mass or more to 100.0% by mass or less. The content (% by mass) of the silver particle in the ink is preferably 2.00% by mass or more to 15.00% by mass or less and further preferably 2.00% by mass or more to 8.00% by mass or less based on the total mass of the ink. The ink may further contain coloring materials other than a silver particle (hereafter referred to as "other coloring materials") or may contain no other coloring materials. The mass ratio of the content (% by mass) of other coloring materials is preferably 0.00 times or more to 5.00 times or less and more preferably 0.00 times or more to 3.00 times or less to the content (% by mass) of the silver particle. The above-described mass ratio is further preferably 0.00 times or more to 0.10 times or less.

Examples of the method for manufacturing a silver particle include a method in which a silver lump is pulverized by using a pulverizer such as a ball mill or a jet mill (pulverization method) and a method in which a silver ion or a silver complex is reduced by using a reducing agent and are aggregated (reduction method). In the present disclosure, a silver particle produced by using the reduction method can be used from the viewpoint of ease in particle size control of a silver particle and from the viewpoint of dispersion stability of the silver particle.

Silver particle dispersed by using a dispersant, for example, a surfactant or a resin, can be used. In particular, the dispersant can be a resin. The content (% by mass) of the dispersant in the ink is preferably 0.10% by mass or more to 5.00% by mass or less based on the total mass of the ink.

Regarding the dispersant of the silver particle, various surfactants such as anionic surfactants, nonionic surfactants, cationic surfactants and amphoteric surfactants may be used. Examples of anionic surfactants include fatty acid salts, alkyl sulfates, alkyl aryl sulfonates, alkyl diaryl ether disulfonates, dialkyl sulfosuccinates, alkyl phosphates, naphthalenesulfonic acid formalin condensates, polyoxyethylene alkyl ether sulfates, polyoxyethylene alkyl phosphates and glycerol borate fatty acid esters. Examples of nonionic surfactants include polyoxyethylene alkyl ethers, polyoxyethylene-polyoxypropylene block copolymers, sorbitan fatty acid esters, glycerin fatty acid esters, polyoxyethylene fatty acid esters, polyoxyethylene alkylamines, fluorine-based compounds and silicone-based compounds. Examples of the cationic surfactant include alkylamine salts, quaternary ammonium salts, alkylpyridinium salts and alkyl imidazolium salts. Examples of anionic surfactants include alkylamine oxides and phosphatidyl choline. Of these, at least one surfactant selected from a group consisting of amphoteric surfactants and nonionic surfactants can be used as the dispersant. Regarding the anionic surfactants, a polyoxyethylene alkyl ether sulfate can be used. Regarding the nonionic surfactants, a polyoxyethylene alkyl ether can be used. In the case in which a surfactant is used as the dispersant, the mass ratio of the content (% by mass) of the dispersant in the ink is preferably 0.02 times or more to 1.00 times or less to the content (% by mass) of the silver particle.

Regarding the dispersant of the silver particle, a resin including a unit having an anionic group and a unit having no anionic group may be used. Examples of the skeleton of the resin include vinyl-based resins, ester-based resins, amino resins, acrylic resins, epoxy-based resins, urethane-based resins, ether-based resins, amide-based resins, phenol-based resins, silicone-based resins and fluorine-based resins. In the case in which a resin is used as the dispersant, the mass ratio of the content (% by mass) of the dispersant in the ink is preferably 0.05 times or more to 1.00 times or less to the content (% by mass) of the silver particle.

The volume-based cumulative 50% particle size (d50) of the silver particle is preferably 100 nm or less and further preferably 50 nm or less. The volume-based cumulative 50% particle size denotes a particle size when the volume of particles is accumulated from the small particle side and reaches 50% with reference to the total volume of measured particles on a particle size cumulative curve. When the cumulative 50% particle size is small, the ratio of silver atoms present on the surface of the silver particle to the number of silver atoms per unit mass is large. Since increasing the proportion of silver atoms that are easy-to-move in a silver particle facilitates formation of a metallic bond between a silver atom present on the surface of a silver particle and silver atoms present on the surface of other silver particle around the silver particle, the silver particle readily fuses with each other. Therefore, when d50 is 50 nm or less, glossiness tends to be improved. The volume-based cumulative 50% particle size is preferably 1 nm or more and further preferably 10 nm or more.

The volume-based cumulative 50% particle size of the silver particle may be measured as described below, where a sample is an ink or a silver particle dispersion liquid diluted with water. After a silicon substrate is coated with the sample, water is removed so as to prepare the sample. The resulting sample is used, 3,000 or more silver particles are observed by using a scanning electron microscope (SEM), a transmission electron microscope (TEM) or the like, image processing is performed, and the particle size defined as described above is calculated. In the examples described later, after silver particles were observed, the particle size was calculated by using image analysis and measurement software (trade name "WinROOF2015", produced by MITANI CORPORATION). In this regard, the particle size of the silver particle may also be measured by subjecting the ink or the dispersion liquid to a dynamic light scattering method. However, in the case in which measurement is performed by using a dynamic light scattering method, since the measurement value tends to fluctuate under the effect of agglomeration or the like, measurement can be performed after sufficient dilution with water.

Organic Monocarboxylic Acid

The ink contains a predetermined organic monocarboxylic acid. A carboxylic acid group of the organic monocarboxylic acid may be either an acid type (H-type) or a salt type. In the case of the salt type, examples of a counter ion for forming the salt include a cation of an alkali metal (lithium, sodium, potassium or the like), an ammonium ion and an organic ammonium ion. The carboxylic acid group can be an acid type or an alkali metal salt type since an interaction with a cationic compound contained in a recording medium readily occurs and, in particular, can be an acid type.

The pKa of the organic monocarboxylic acid may be measured by using a known method, for example, a titration method, an absorptiometric method or a capillary electrophoresis method, where a value at 25° C. in water is exploited. In this regard, the values of the pKa of general-purpose compounds are described in various literature. In the present specification, the value of pKa is described in "Handbook of Chemistry: Pure Chemistry, 3rd ed., pages 11-338 to 342, 1984, Maruzen Company, Limited". Regarding the pKa of a compound not described in this literature, a value measured by using a titration method on the basis of the Henderson-Hasselbalch equation was adopted. This equation is represented by $pH=pKa+\log_{10}([A^-]/[HA])$ where an acid compound in an undissociated state is represented by HA, an acid in a dissociated state is represented by $A^-$ and the concentrations (activity) of these are represented by [HA] and [$A^-$], respectively. The concentration of the acid compound in an undissociated state is equal to the concentration of the acid composition in a dissociated state. That is, when half of the acid compound is dissociated, $\log_{10}([A^-]/[HA])=\log_{10}(1)=0$ holds true, and pH is equal to pKa. Therefore, a neutralization point may be determined while a pH is appropriately measured by using a titration method, and the pH may be taken as the pKa when 0.5 times the equivalent (value obtained by dividing the concentration by the valence of the base) of the base aqueous solution used until reaching the neutralization point is added. First organic monocarboxylic acid The ink contains a first organic monocarboxylic acid having a pKa of 4.60 or more. Examples of the first organic monocarboxylic acid include aliphatic monocarboxylic acids and aromatic monocarboxylic acids. The first organic monocarboxylic acid can have neither a hydroxy group nor an oxo group (=O) other than that constituting a carboxylic group. The first organic monocarboxylic acid differs from both of the second organic monocarboxylic acid described later and the third organic monocarboxylic acid that may be used for the ink as the situation demands.

There is no particular limitation regarding the first organic monocarboxylic acid provided that the pKa is 4.60 or more. Examples of the first organic monocarboxylic acid include propionic acid (4.67), butyric acid (4.63), 2-methylpropionic acid (4.63), valeric acid (4.64), 2,2-dimethylpropionic acid (4.90), caproic acid (4.63) and enanthic acid (4.66), where the pKa is given in parentheses. The pKa of the first organic monocarboxylic acid is preferably 5.00 or less.

An aliphatic monocarboxylic acid having a structure that does not include a rigid bond can be used since molecular motion after the ink is applied to a recording medium is not readily hindered and since a reaction with a cationic compound tends to occur. In addition, the carbon number of the first organic monocarboxylic acid is preferably 5 or less, since a hydrophilic property suitable for inclusion in the aqueous ink is provided and since the ink has excellent storage stability. Meanwhile, the carbon number of the first organic monocarboxylic acid is preferably 3 or more. In this case, the carbon number includes a carbon atom constituting a carboxylic acid group, and, for example, the carbon number of propionic acid is 3.

The content (ppm) of the first organic monocarboxylic acid in the ink is preferably 10 ppm or more based on a total mass of the ink. If the content is less than 10 ppm, a higher level of abrasion resistance and storage stability are not limited to being sufficiently obtained. The content is further preferably 50 ppm or more. Meanwhile, the content (ppm) of the first organic monocarboxylic acid in the ink is preferably 8,000 ppm or less and further preferably 5,000 ppm or less based on a total mass of the ink.

Second Organic Monocarboxylic Acid

The ink contains the second organic monocarboxylic acid having a pKa of less than 4.60 and having a carbon number of 2 or less.

In this case, the carbon number includes a carbon atom constituting a carboxylic acid group. The second organic monocarboxylic acid differs from both of the first organic monocarboxylic acid and the third organic monocarboxylic acid that may be used for the ink as the situation demands. The second organic monocarboxylic acid can have neither a hydroxy group nor an oxo group (=O) other than that constituting a carboxylic group, and examples of the second organic monocarboxylic acid include aliphatic monocarboxylic acids such as formic acid (3.55) and acetic acid (4.56), where the pKa is given in parentheses. The pKa of the second organic monocarboxylic acid is preferably 3.00 or more.

The content (ppm) of the second organic monocarboxylic acid in the ink is preferably 10 ppm or more to 8,000 ppm or less and further preferably 10 ppm or more to 5,000 ppm or less based on a total mass of the ink. The mass ratio of the content (ppm) of the second organic monocarboxylic acid in the ink is preferably 0.10 times or more to 5.00 times or less and further preferably 1.00 times or more to 5.00 times or less to the content (ppm) of the first organic monocarboxylic acid.

Third Organic Monocarboxylic Acid

The ink can contain (iii) the third organic monocarboxylic acid that has a carbon number of 6 or less and that is selected from a group consisting of organic hydroxymonocarboxylic acids and organic oxomonocarboxylic acids. As described above, the first organic monocarboxylic acid coordinating with the silver ion generated in the ink suppresses the silver particle from agglomerating. However, in this case, since the structure other than the carboxylic acid group of the first organic monocarboxylic acid, that is, the organic group portion, takes on a state of being located on the aqueous medium side, a hydrophobic interaction between organic groups readily occurs. Therefore, there is room for further improving the ink storage stability. Herein, if the third organic monocarboxylic acid is added, since an interaction between the first organic monocarboxylic acid in which an organic group is arranged on the aqueous medium side and the third organic monocarboxylic acid occurs so as to enhance a hydrophilic property, a higher level of ink storage stability is obtained. The third organic monocarboxylic acid has favorable affinity for the first organic monocarboxylic acid due to having a structure similar to the first organic monocarboxylic acid. Further, the third organic monocarboxylic acid has a small carbon number and, in addition to the effect of improving the hydrophilic property due to the hydroxy group or the oxo group, has the above-described effect since a reaction of the first organic monocarboxylic acid with a cationic compound is not hindered.

The third organic monocarboxylic acid has a carbon number of 6 or less and is selected from a group consisting of organic hydroxymonocarboxylic acids and organic oxomonocarboxylic acids. In this case, the carbon number includes a carbon atom constituting a carboxylic acid group. The carbon number of the third organic monocarboxylic acid is preferably 4 or more. The third organic monocarboxylic acid differs from both of the first organic monocarboxylic acid and the second organic monocarboxylic acid. Examples of the third organic monocarboxylic acid include aliphatic monocarboxylic acids and aromatic monocarboxylic acids.

There is no particular limitation regarding the third organic monocarboxylic acid provided that a hydroxy group or an oxo group is included in addition to a carboxylic acid group. Examples of the third organic monocarboxylic acid include hydroxybutyric acid, hydroxyvaleric acid, hydroxycaproic acid, oxobutyric acid, oxovaleric acid, and oxocaproic acid.

A hydroxy group or an oxo group can be present on a carbon atom adjacent to a carbon atom bonded to a carboxylic acid group. In this case, an oxygen atom constituting each of these groups and two oxygen atoms constituting a carboxy group being involved in coordination enable the interaction with the first organic monocarboxylic acid to be enhanced. Specifically, an organic 2-hydroxymonocarboxylic acid or an organic α-oxomonocarboxylic acid can be used. Examples of the organic 2-hydroxymonocarboxylic acid include 2-hydroxybutyric acid, 2-hydroxyvaleric acid and 2-hydroxycaproic acid. Examples of the organic α-oxomonocarboxylic acid include α-oxobutyric acid, α-oxovaleric acid and α-oxocaproic acid.

In the case in which the third organic monocarboxylic acid is an organic 2-hydroxymonocarboxylic acid or an organic α-oxomonocarboxylic acid, the carbon number $N_1$ of the first organic monocarboxylic acid and the carbon number $N_2$ of the third organic monocarboxylic acid can satisfy $N_1+1=N_2$. The third organic monocarboxylic acid may coordinate with the first organic monocarboxylic acid via an oxygen atom of a hydroxy group or an oxo group bonding to a carbon atom adjacent to a carbon atom bonding to a carboxylic acid group and via two oxygen atoms of a carboxy group. The third organic monocarboxylic acid coordinates with a silver ion via a carboxy group of the third organic monocarboxylic acid. In the case in which the relationship of $N_1+1=N_2$ is satisfied, the number of carbon atoms not involved in coordination with a silver ion in the molecular structure of the first organic monocarboxylic acid ($=N_1-1$) is equal to the number of carbon atoms not involved in coordination with a silver ion in the molecular structure of the third organic monocarboxylic acid ($=N_2-2$). That is, in the case in which the above-described relationship is satisfied, since organic groups involved in the interaction between the first organic monocarboxylic acid and the third organic monocarboxylic acid have an identical number of carbon atoms, a stronger interaction occurs so as to provide a higher level of ink storage stability.

The content (ppm) of the third organic monocarboxylic acid in the ink is preferably 10 ppm or more to 8,000 ppm or less and further preferably 10 ppm or more to 5,000 ppm or less based on a total mass of the ink. The mass ratio of the content (ppm) of the third organic monocarboxylic acid in the ink is preferably 0.10 times or more to 10.00 times or less to the content (ppm) of the first organic monocarboxylic acid.

Penta- or Higher-Valent Sugar Alcohol

The ink can contain a penta- or higher-valent sugar alcohol. A hydroxy group of the sugar alcohol tends to be negatively charged. As described above, giving and receiving of electrons is performed between a silver particle and a silver ion. The surface of a silver particle tends to be positively charged and, therefore, interaction with a negatively charged compound tends to occur. Since a large amount of water is present in the ink, when a silver particle and the sugar alcohol are present together, they do not have an effect on each other and are present stably. When an ink is applied to a recording medium and water is reduced, a dissolved state of the sugar alcohol becomes unstable and precipitation occurs. During this process, since the hydroxy group of the negatively charged sugar alcohol is oriented on the surface of the positively charged silver particle, a state in which a hydrocarbon chain portion of the sugar alcohol is arranged on the aqueous medium side is produced. Consequently, since a hydrophobic interaction occurs due to the hydrocarbon chain so as to facilitate agglomeration of the silver particle, the abrasion resistance immediately after a metallic image is recorded is further improved. Such an effect is exerted more effectively as the number of hydroxy groups of the sugar alcohol increases, and a penta- or higher-valent sugar alcohol can be used.

The sugar alcohol is a polyvalent alcohol that corresponds to a saccharide (can be a chain saccharide) in which an aldehyde group or a ketone group is reduced to a first alcohol group or a second alcohol group, respectively. The valence of the sugar alcohol denotes the number of hydroxy groups and is usually equal to the carbon number of a hydrocarbon chain constituting the sugar alcohol. The valence of the sugar alcohol is preferably pentavalence or higher and is preferably decavalence or less and further preferably octavalence or less. Examples of the penta- or higher-valent sugar alcohol include xylitol, ribitol, sorbitol, mannitol and maltitol. Because of reduced steric hindrance and ease in efficient orientation on the surface of the silver article, a monosaccharide sugar alcohol can be used, and, in particular, xylitol and sorbitol can be used.

The content (% by mass) of the penta- or higher-valent sugar alcohol in the ink is preferably 0.10% by mass or more to 10.00% by mass or less based on a total mass of the ink. The mass ratio of the content (% by mass) of the penta- or higher-valent sugar alcohol in the ink is preferably 0.50 times or more to the content (% by mass) of the silver particle. If the above-described mass ratio is less than 0.50 times, the effect of further improving the abrasion resistance immediately after a metallic image is recorded is possibly insufficiently obtained. In addition, the ink tends to stick, and a sticking recovery property may deteriorate. Therefore, the above-described mass ratio is preferably 5.00 times or less.

Alkanediol

The ink can contain an alkanediol. In particular, an α,β-alkanediol and an α,ω-alkanediol can be contained. The α,β-alkanediol is a compound having a structure in which a hydroxy group is located as a substituent on a terminal carbon atom of a saturated hydrocarbon chain (alkane) and on a carbon atom adjacent to the terminal carbon atom. Meanwhile, the α,ω-alkanediol is a compound having a structure in which a hydroxy group is located as a substituent on both terminal carbon atoms of a saturated hydrocarbon chain (alkane).

The α,β-alkanediol has a molecular structure similar to the first organic monocarboxylic acid or the third organic monocarboxylic acid that may be used as the situation demands and has excellent affinity for these compounds. Consequently, using the α,β-alkanediol enables the dissolved state of these compounds to be particularly stably maintained without impairing the effects of these compounds.

The hydrocarbon chain portion of the α,β-alkanediol may be either a straight chain or a branched chain but can be a straight chain to efficiently cause an interaction with the first organic monocarboxylic acid or the third organic monocarboxylic acid. The carbon number of the α,β-alkanediol is preferably 3 to 8 and further preferably 4 to 6. Examples of the α,β-alkanediol include 1,2-propanediol, 1,2-butanediol, 1,2-pentanediol, 1,2-hexanediol, 1,2-heptanediol and 1,2-octanediol. Of these, 1,2-pentanediol and 1,2-hexanediol can be used. The content (% by mass) of the α,β-alkanediol in the ink is preferably 0.10% by mass or more to 10.00% by mass or less based on a total mass of the ink.

The α,ω-alkanediol has a hydrocarbon chain interposed between two hydroxy groups and has excellent affinity for a penta- or higher-valent sugar alcohol that may be used as the situation demands. Consequently, using the α,ω-alkanediol enables the dissolved state of the penta- or higher-valent sugar alcohol to be particularly stably maintained without impairing the effects thereof.

The hydrocarbon chain portion of the α,ω-alkanediol may be either a straight chain or a branched chain; a straight chain efficiently causes an interaction with the penta- or higher-valent sugar alcohol. The carbon number of the α,ω-alkanediol is preferably 3 to 8 and further preferably 4 to 6. Examples of the α,ω-alkanediol include 1,3-propanediol, 1,4-butanediol, 1,5-pentanediol, 1,6-hexanediol, 1,7-heptanediol and 1,8-octanediol. Of these, 1,5-pentanediol and 1,6-hexanediol can be used. The content (% by mass) of the α,ω-alkanediol in the ink is preferably 0.10% by mass or more to 20.00% by mass or less based on a total mass of the ink.

Surfactant

The ink can further contain a surfactant other than the surfactant that may be used as a dispersant of the silver particle. The content (% by mass) of the surfactant other than the surfactant that is used as a dispersant of the silver particle in the ink is preferably 0.10% by mass or more to 2.00% by mass or less based on a total mass of the ink.

Examples of the surfactant include anionic surfactants, nonionic surfactants, cationic surfactants and amphoteric surfactants. Of these, nonionic surfactants can be used, and particularly, nonionic surfactants having an ethylene oxide group can be used. In particular, nonionic surfactants having a structure in which an ethylene oxide group is added to an acetylene glycol skeleton can be used. Since an ethylene oxide structure readily coordinates with a metal ion, mixing such a nonionic surfactant into the ink stabilizes a silver ion generated in the ink and enables storage stability to be effectively suppressed from deteriorating.

Aqueous Medium

The ink is an aqueous ink containing at least water as an aqueous medium. The ink may contain water or an aqueous medium which is a solvent mixture of water and a water-soluble organic solvent. Regarding the water, deionized water or ion-exchanged water can be used. The content (% by mass) of the water in the aqueous ink is preferably 50.00% by mass or more to 95.00% by mass or less based on a total mass of the ink.

There is no particular limitation regarding the water-soluble organic solvent provided that the solvent is water-soluble, and one selected from the group containing alcohols, (poly)alkylene glycols, glycol ethers, nitrogen-containing polar solvents and sulfur-containing polar solvents other than those described above may be used. The content (% by mass) of the water-soluble organic solvent in the ink is preferably 3.00% by mass or more to 50.00% by mass or less based on a total mass of the ink. If the content of the water-soluble organic solvent is outside the above-described range, reliability of ejection stability or the like may deteriorate to some extent.

Other Components

The ink may contain water-soluble organic components such as urea or derivatives thereof, trimethylolpropane and trimethylolethane, which are solid at 25° C., in addition to the above-described components. In this regard, the ink may contain various additives, for example, a debubbling agent, a pH adjuster, a rust inhibitor, a preservative, a fungicide, an antioxidant, a reducing inhibitor, a chelating agent and the like, as the situation demands, in addition to the above-described components.

Physical Properties of Ink

The viscosity of the ink at 25° C. is preferably 1 mPa·s or more to 6 mPa·s or less and further preferably 1 mPa·s or more to 4 mPa·s or less. Meanwhile, the surface tension of the ink at 25° C. is preferably 10 mN/m or more to 60 mN/m or less, further preferably 20 mN/m or more to 50 mN/m or less and, in particular, 25 mN/m or more to 40 mN/m or less.

Ink Cartridge

An ink cartridge according to the present disclosure includes an ink and an ink-storage portion configured to store the ink. The ink stored in the ink-storage portion is the above-described aqueous ink according to the present disclosure. FIG. 1 is a schematic sectional view illustrating an embodiment of an ink cartridge according to the present disclosure. As illustrated in FIG. 1, an ink supply port 12 configured to supply the ink to a recording head is formed in the bottom face of the ink cartridge. The inside of the ink cartridge serves as an ink-storage portion configured to store the ink. The ink-storage portion is composed of an ink-storage chamber 14 and an absorber holder 16, and these are in communication with each other through a communication port 18. The absorber holder 16 is in communication with the ink supply port 12. The ink-storage chamber 14 stores a liquid ink 20, and the absorber holder 16 stores absorbers 22 and 24 configured to hold the ink in an impregnation state. The ink-storage portion may include no ink-storage chamber configured to store a liquid ink and may be in the form of an absorber configured to hold all of the ink. Alternatively, the ink-storage portion may include no absorber and may be in a form configured to store all of the ink in a liquid state. Further, the ink cartridge may be in a form configured to include an ink-storage portion and a recording head.

Ink Jet Recording Method

The ink jet recording method according to the present disclosure is a method for recording an image (metallic image) on a recording medium by ejecting the above-described aqueous ink according to the present disclosure from a recording head of an ink jet system. Examples of the system for ejecting the ink include a system in which mechanical energy is applied to the ink and a system in which thermal energy is applied to the ink. In the present disclosure, in particular, a system in which the ink is ejected by applying thermal energy to the ink can be adopted. The process of the ink jet recording method may be a known process except that the ink according to the present disclosure is used.

Figure 2A:
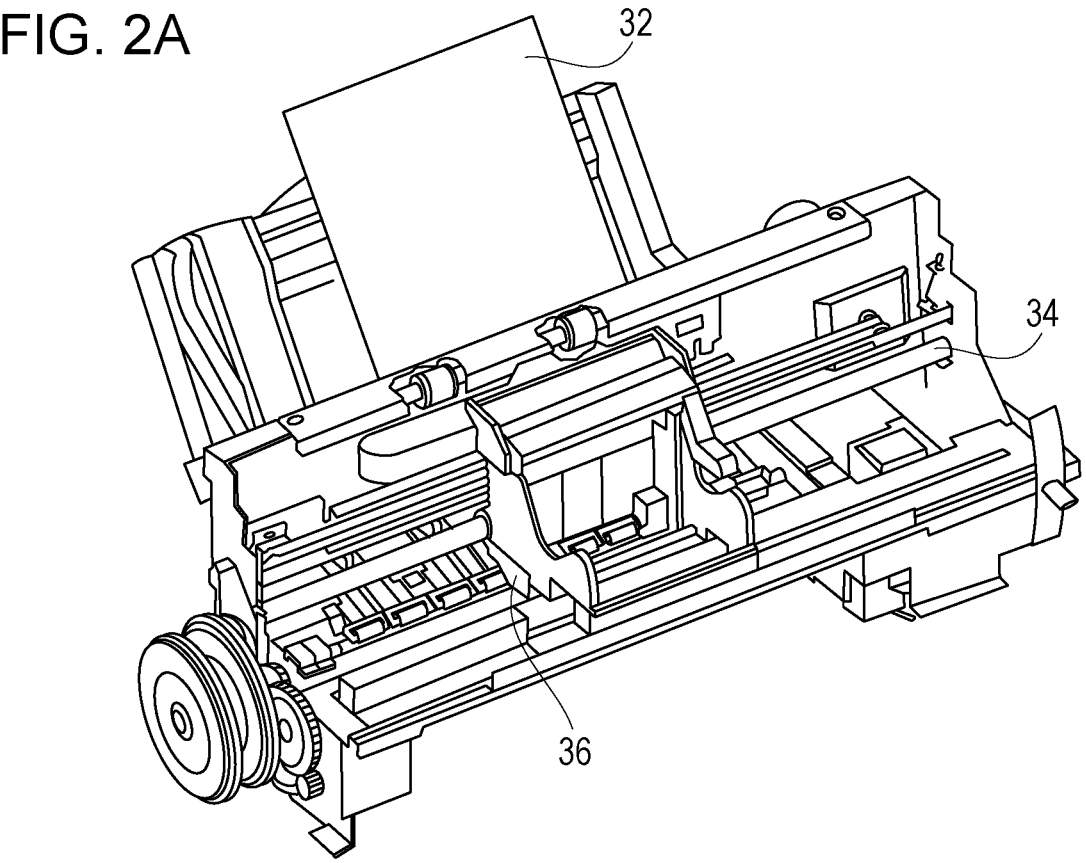
FIGS. 2A and 2B are schematic diagrams illustrating an example of an ink jet recording apparatus used for an ink jet recording method according to the present disclosure.
Figure 2B:
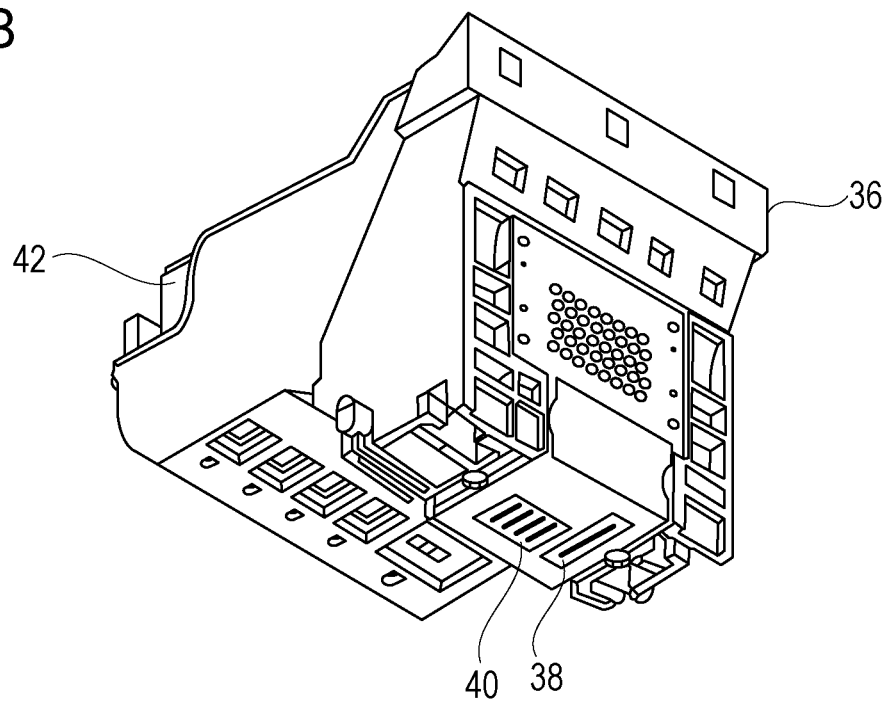

FIGS. 2A and 2B are schematic diagrams illustrating an example of an ink jet recording apparatus used for an ink jet recording method according to the present disclosure, FIG. 2A is a perspective view illustrating a main portion of the ink jet recording apparatus, and FIG. 2B is a perspective view illustrating a head cartridge. The ink jet recording apparatus includes a conveyance unit (not illustrated in the drawing) configured to convey a recording medium 32 and a carriage shaft 34. A head cartridge 36 is mountable on the carriage shaft 34. The head cartridge 36 includes recording heads 38 and 40 and is configured to be set with an ink cartridge 42. The ink (not illustrated in the drawing) is ejected from the recording heads 38 and 40 toward the recording medium 32 while the head cartridge 36 is conveyed along the carriage shaft 34 in the main scanning direction. Then, the recording medium 32 is conveyed in the sub-scanning direction by the conveyance unit (not illustrated in the drawing) and, as a result, an image (metallic image) is recorded on the recording medium 32.

Any type of recording medium may be used as the recording medium that is a target of recording by using the ink according to the present disclosure, and a paper-based recording medium having permeability, for example, plain paper and a recording medium having an ink-receiving layer (glossy paper or art paper), can be used. Of these, a recording medium having an ink-receiving layer, for example, glossy paper, can be used because a recorded image has an excellent metallic appearance. The recording medium, for example, glossy paper, that is used in the ink jet recording method usually has an ink-receiving layer containing a halide ion such as a chloride ion. The halide ion is derived from a cationic compound represented by such as polydiallyl dimethyl ammonium chloride or polyaluminum chloride.

EXAMPLE

The present disclosure will be described below in further detail with reference to the examples, the comparative examples and reference examples but the invention is not limited to the examples described below within the bounds of not departing from the spirit of the present disclosure. The amount of the component expressed in "part" or "%" is on a mass basis, unless otherwise specified.

PKa of Organic Acid

The pKa of an organic acid was described in "Handbook of Chemistry: Pure Chemistry, 3rd ed., pages 11-338 to 342, 1984, Maruzen Company, Limited". The pKa of an organic acid not described in this literature was measured by using the following method. A 0.1 mol/L aqueous solution of a measurement target compound was prepared, and the pKa was measured by a titration method using a 0.1 mol/L sodium hydroxide solution "Titrant for volumetric analysis" (produced by KANTO CHEMICAL CO., INC.). An automatic titrator (trade name "888 Titrando" produced by Metrohm) was used for neutralization titration.

Volume-Based Cumulative 50% Particle Size

The volume-based cumulative 50% particle size of the silver particle or resin particle was measured by using the following procedure. A substrate formed of a silicon material was coated with a dispersion liquid diluted by a factor of about 2,000 (on a mass basis) with ion-exchanged water, and water was removed by drying so as to prepare a sample. The resulting sample was used, 3,000 or more silver particles were observed by using a scanning electron microscope, and image processing was performed by using image analysis and measurement software (trade name "WinROOF2015", produced by MITANI CORPORATION) so as to calculate the particle size.

Preparation of Silver Particle Dispersion Liquid

Silver Particle Dispersion Liquid 1

Silver particle dispersion liquid 1 having a silver particle content of 10.0% and having a content of solids of resin dispersant (trade name "Disperbyk190") of 3.0% was prepared as described in Example 2 in PCT Japanese Translation Patent Publication No. 2010-507727. The volume-based cumulative 50% particle size of the silver particle was 42 nm.

Silver Particle Dispersion Liquid 2

Silver particle dispersion liquid 2 having a silver particle content of 10.0% and having a content of resin dispersant (polyvinyl pyrrolidone) of 3.0% was prepared as described in the example in Japanese Patent Laid-Open No. 2012-121279. The volume-based cumulative 50% particle size of the silver particle was 38 nm.

Silver Particle Dispersion Liquid 3

Silver particle dispersion liquid 3 having a silver particle content of 10.0% was prepared as described in Ink 1 in Japanese Patent Laid-Open No. 2014-033176. The volume-based cumulative 50% particle size of the silver particle was 22 nm.

Silver Particle Dispersion Liquid 4

Silver particle dispersion liquid 4 containing a resin dispersant (trade name "Disperbyk190") and protection colloids (cholic acid, pKa=4.98) was prepared as described in "Preparation of silver particle dispersion liquid 1) in Japanese Patent Laid-Open No. 2018-090719. The volume-based cumulative 50% particle size of the silver particle was 15 nm. The composition of Silver particle dispersion liquid 4 prepared is as described below.

Silver particle: 15.0%
Resin dispersant (solid content): 1.0%
Dimethylaminoethanol: 35.4%
Cholic acid: 0.6%
Ion-exchanged water (containing nitrate ions): 48.0%

Pigment Dispersion Liquid

A mixture was obtained by mixing 24.0 parts of C.I. Pigment Blue 15:3, 48.0 parts of resin dispersant aqueous solution and 28.0 parts of ion-exchanged water. Regarding the resin dispersant aqueous solution, an aqueous solution that was obtained by neutralizing a styrene-acrylic copolymer (trade name "Joncryl 680", produced by BASF) with 0.85 times (molar ratio) the acid value of potassium hydroxide and by adding an appropriate amount of ion-exchanged water and that had a water-soluble resin content of 20.0% was used. The resulting mixture and 85 parts of zirconia particles having a size of 0.3 mm were placed in a batch-type vertical sand mill (produced by IMEX CO., Ltd.) and were dispersed for 3 hours while water cooling was performed. Thereafter, coarse particles were removed by centrifugal separation. Pressure filtration was performed by using a cellulose acetate filter having a pore size of 3.0 µm (produced by ADVANTEC) so as to prepare a pigment dispersion liquid having a pigment content of 20.0% and a resin content of 8.0%.

Synthesis of Resin Particle

A resin particle formed of a polyester-based urethane resin was synthesized as described in "Preparation example 1 of resin dispersion liquid containing resin particles" in Japanese Patent Laid-Open No. 2018-090719, and a resin particle water dispersion liquid having a resin particle content of 30.0% was prepared. The volume-based cumulative 50% particle size of the resin particle was 20 nm.

Preparation of Ink

The components described in the upper sections of Tables 1 to 3 (unit is described on a component basis) were mixed and sufficiently agitated and, thereafter pressure filtration was performed by using a cellulose acetate filter having a pore size of 0.8 µm (produced by ADVANTEC) so as to obtain an ink. Regarding each of a first organic monocarboxylic acid, a second organic monocarboxylic acid and an organic monocarboxylic acid used as a reference example, the pKa is described in parentheses. Acetylenol E100 is a trade name of a nonionic surfactant produced by Kawaken Fine Chemicals Co., Ltd., and has a structure in which an ethylene oxide group is added to an acetylene glycol skeleton. The amount of ion-exchanged water used was set to be the rest that was the remaining part of 100.0% of total components. Each organic monocarboxylic acid content in the ink is described in the lower section of Tables 1 to 3.

TABLE 1

Composition and characteristics of ink

| | Example | | | | | | | | |
|---|---|---|---|---|---|---|---|---|---|
| | 1 | 2 | 3 | 4 | 5 | 6 | 7 | 8 | 9 |
| Silver particle dispersion liquid 1 (%) | 50.00 | | | 50.00 | 50.00 | 50.0 | 50.00 | 50.00 | 50.00 |
| Silver particle dispersion liquid 2 (%) | | 50.00 | | | | | | | |
| Silver particle dispersion liquid 3 (%) | | | 50.00 | | | | | | |
| Silver particle dispersion liquid 4 (%) | | | | | | | | | |
| Pigment dispersion liquid (%) | | | | | | | | | |
| Formic acid (ppm, 3.55) | 500 | 500 | 500 | 500 | 500 | 500 | 500 | 500 | 500 |
| Acetic acid (ppm, 4.56) | | | | | | | | | |
| Propionic acid (ppm, 4.67) | 500 | | | | | | | | |
| Butyric acid (ppm, 4.63) | | | | 500 | | | | | |
| 2-Methyl-propionic acid (ppm, 4.63) | | | | | 500 | | | | |
| Valeic acid (ppm, 4.64) | | 500 | 500 | | | 500 | 8 | 10 | 5000 |
| 2,2-Dimethyl-propionic acid (ppm, 4.90) | | | | | | | | | |
| Caproic acid (ppm, 4.63) | | | | | | | | | |
| Enanthic acid (ppm, 4.66) | | | | | | | | | |
| Benzoic acid (ppm, 4.20) | | | | | | | | | |
| Oxalic acid (ppm, 1.04) | | | | | | | | | |
| Malonic acid (ppm, 2.65) | | | | | | | | | |
| Chloroacetic acid (ppm, 2.68) | | | | | | | | | |
| Methanesulfonic acid (ppm) | | | | | | | | | |
| 2-Hydroxybutyric acid (ppm) | | | | | | | | | |
| α-Oxobutyric acid (ppm) | | | | | | | | | |
| 2-Hydroxyvaleic acid (ppm) | | | | | | | | | |
| α-Oxovaleic acid (ppm) | | | | | | | | | |
| 2Hydroxycaproic acid (ppm) | 500 | 500 | 500 | 500 | 500 | 500 | 500 | 500 | 500 |
| α-Oxocaproic acid (ppm) | | | | | | | | | |
| 2-Hydroxyenanthic acid (ppm) | | | | | | | | | |
| Propylene glycol (%) | 6.00 | 6.00 | 6.00 | 6.00 | 6.00 | 6.00 | 6.00 | 6.00 | 6.00 |
| Glycerin (%) | 5.00 | 5.00 | 5.00 | 5.00 | 5.00 | 5.00 | 5.00 | 5.00 | 5.00 |
| 1,2-Hexanediol (%) | 3.00 | 3.00 | 3.00 | 3.00 | 3.00 | 3.00 | 3.00 | 3.00 | 3.00 |

TABLE 1-continued

| Composition and characteristics of ink | | | | | | | | | |
|---|---|---|---|---|---|---|---|---|---|
| 1,6-Hexanediol (%) | 3.00 | 3.00 | 3.00 | 3.00 | 3.00 | 3.00 | 3.00 | 3.00 | 3.00 |
| Sorbitol (%) | 3.00 | 3.00 | 3.00 | 3.00 | 3.00 | 3.00 | 3.00 | 3.00 | 3.00 |
| Mannitol (%) | | | | | | | | | |
| Xylitol (%) | | | | | | | | | |
| Triethanolamine (%) | | | | | | | | | |
| 3-Ethyl-3-hydroxymethyloxetane (%) | | | | | | | | | |
| Resin particle water dispersion liquid (%) | | | | | | | | | |
| Acetylenol E100 (%) | 0.50 | 0.50 | 0.50 | 0.50 | 0.50 | 0.50 | 0.50 | 0.50 | 0.50 |
| Sodium dodecyl sulfate (%) | | | | | | | | | |
| 2,4,7,9-Tetramethyl-decane-4,7-diol (%) | | | | | | | | | |
| Ion-exchanged water (%) | rest | rest | rest | rest | rest | rest | rest | rest | rest |
| First organic monocarboxylic acid content $C_1$(ppm) | 500 | 500 | 500 | 500 | 500 | 500 | 8 | 10 | 5000 |
| Second organic monocarboxylic acid content $C_2$(ppm) | 500 | 500 | 500 | 500 | 500 | 500 | 500 | 500 | 500 |
| Third organic monocarboxylic acid content $C_3$(ppm) | 500 | 500 | 500 | 500 | 500 | 500 | 500 | 500 | 500 |

| | | Example | | | | | | | |
|---|---|---|---|---|---|---|---|---|---|
| | | 10 | 11 | 12 | 13 | 14 | 15 | 16 | 17 |
| | Silver particle dispersion liquid 1 (%) | 50.00 | 50.00 | 50.00 | 50.00 | 50.00 | 50.00 | 50.00 | 50.00 |
| | Silver particle dispersion liquid 2 (%) | | | | | | | | |
| | Silver particle dispersion liquid 3 (%) | | | | | | | | |
| | Silver particle dispersion liquid 4 (%) | | | | | | | | |
| | Pigment dispersion liquid (%) | | | | | | | | |
| | Formic acid (ppm, 3.55) | 500 | 500 | 500 | | 500 | 500 | 500 | 500 |
| | Acetic acid (ppm, 4.56) | | | | 500 | | | | |
| | Propionic acid (ppm, 4.67) | | | | | | | | |
| | Butyric acid (ppm, 4.63) | | | | | | | | |
| | 2-Methyl-propionic acid (ppm, 4.63) | | | | | | | | |
| | Valeic acid (ppm, 4.64) | | | | 500 | 500 | 500 | 500 | 500 |
| | 2,2-Dimethyl-propionic acid (ppm, 4.90) | 500 | | | | | | | |
| | Caproic acid (ppm, 4.63) | | 500 | | | | | | |
| | Enanthic acid (ppm, 4.66) | | | 500 | | | | | |
| | Benzoic acid (ppm, 4.20) | | | | | | | | |
| | Oxalic acid (ppm, 1.04) | | | | | | | | |

TABLE 1-continued

| Composition and characteristics of ink | | | | | | | | |
|---|---|---|---|---|---|---|---|---|
| Malonic acid (ppm, 2.65) | | | | | | | | |
| Chloroacetic acid (ppm, 2.68) | | | | | | | | |
| Methanesulfonic acid (ppm) | | | | | | | | |
| 2-Hydroxybutyric acid (ppm) | | | | | | | | 500 |
| α-Oxobutyric acid (ppm) | | | | | | | | |
| 2-Hydroxyvaleic acid (ppm) | | | | | | | | |
| α-Oxovaleic acid (ppm) | | | | | | | | |
| 2Hydroxycaproic acid (ppm) | 500 | 500 | 500 | 500 | | | | |
| α-Oxocaproic acid (ppm) | | | | | | 500 | | |
| 2-Hydroxy-enanthic acid (ppm) | | | | | | | | 500 |
| Propylene glycol (%) | 6.00 | 6.00 | 6.00 | 6.00 | 6.00 | 6.00 | 6.00 | 6.00 |
| Glycerin (%) | 5.00 | 5.00 | 5.00 | 5.00 | 5.00 | 5.00 | 5.00 | 5.00 |
| 1,2-Hexanediol (%) | 3.00 | 3.00 | 3.00 | 3.00 | 3.00 | 3.00 | 3.00 | 3.00 |
| 1,6-Hexanediol (%) | 3.00 | 3.00 | 3.00 | 3.00 | 3.00 | 3.00 | 3.00 | 3.00 |
| Sorbitol (%) | 3.00 | 3.00 | 3.00 | 3.00 | 3.00 | 3.00 | 3.00 | 3.00 |
| Mannitol (%) | | | | | | | | |
| Xylitol (%) | | | | | | | | |
| Triethanolamine (%) | | | | | | | | |
| 3-Ethyl-3-hydroxy-methyl-oxetane (%) | | | | | | | | |
| Resin particle water dispersion liquid (%) | | | | | | | | |
| Acetylenol E100 (%) | 0.50 | 0.50 | 0.50 | 0.50 | 0.50 | 0.50 | 0.50 | 0.50 |
| Sodium dodecyl sulfate (%) | | | | | | | | |
| 2,4,7,9-Tetramethyl-decane-4,7-diol (%) | | | | | | | | |
| Ion-exchanged water (%) | rest | rest | rest | rest | rest | rest | rest | rest |
| First organic monocarboxylic acid content $C_1$ (ppm) | 500 | 500 | 500 | 500 | 500 | 500 | 500 | 500 |
| Second organic monocarboxylic acid content $C_2$ (ppm) | 500 | 500 | 500 | 500 | 500 | 500 | 500 | 500 |
| Third organic monocarboxylic acid content $C_3$ (ppm) | 500 | 500 | 500 | 500 | 0 | 500 | 0 | 500 |

TABLE 2

| | Composition and characteristics of ink | | | | | | | | |
|---|---|---|---|---|---|---|---|---|---|
| | Example | | | | | | | | |
| | 18 | 19 | 20 | 21 | 22 | 23 | 24 | 25 | 26 |
| Silver particle dispersion liquid 1 (%) | 50.00 | 50.00 | 50.00 | 50.00 | 50.00 | 50.00 | 50.00 | 50.00 | 50.00 |
| Silver particle dispersion liquid 2 (%) | | | | | | | | | |
| Silver particle dispersion liquid 3 (%) | | | | | | | | | |
| Silver particle dispersion liquid 4 (%) | | | | | | | | | |
| Pigment dispersion liquid (%) | | | | | | | | | |

TABLE 2-continued

Composition and characteristics of ink

| | | | | | | | | | |
|---|---|---|---|---|---|---|---|---|---|
| Formic acid (ppm, 3.55) | 500 | 500 | 500 | 500 | 500 | 500 | 500 | 500 | 500 |
| Acetic acid (ppm, 4.56) | | | | | | | | | |
| Propionic acid (ppm, 4.67) | | | | 500 | 500 | | | | |
| Butyric acid (ppm, 4.63) | | | | | | 500 | 500 | | |
| 2-Methylpropionic acid (ppm, 4.63) | | | | | | | | 500 | 500 |
| Valeic acid (ppm, 4.64) | 500 | 500 | 500 | | | | | | |
| 2,2-Dimethylpropionic acid (ppm, 4.90) | | | | | | | | | |
| Caproic acid (ppm, 4.63) | | | | | | | | | |
| Enanthic acid (ppm, 4.66) | | | | | | | | | |
| Benzoic acid (ppm, 4.20) | | | | | | | | | |
| Oxalic acid (ppm, 1.04) | | | | | | | | | |
| Malonic acid (ppm, 2.65) | | | | | | | | | |
| Chloroacetic acid (ppm, 2.68) | | | | | | | | | |
| Methanesulfonic acid (ppm) | | | | | | | | | |
| 2-Hydroxybutyric acid (ppm) | | | | 500 | | | | | |
| α-Oxobutyric acid (ppm) | 500 | | | | 500 | | | | |
| 2-Hydroxyvaleic acid (ppm) | | 500 | | | | 500 | | 500 | |
| α-Oxovaleic acid (ppm) | | | 500 | | | | 500 | | 500 |
| 2-Hydroxycaproic acid (ppm) | | | | | | | | | |
| α-Oxocaproic acid (ppm) | | | | | | | | | |
| 2-Hydroxyenanthic acid (ppm) | | | | | | | | | |
| Propylene glycol (%) | 6.00 | 6.00 | 6.00 | 6.00 | 6.00 | 6.00 | 6.00 | 6.00 | 6.00 |
| Glycerin (%) | 5.00 | 5.00 | 5.00 | 5.00 | 5.00 | 5.00 | 5.00 | 5.00 | 5.00 |
| 1,2-Hexanediol (%) | 3.00 | 3.00 | 3.00 | 3.00 | 3.00 | 3.00 | 3.00 | 3.00 | 3.00 |
| 1,6-Hexanediol (%) | 3.00 | 3.00 | 3.00 | 3.00 | 3.00 | 3.00 | 3.00 | 3.00 | 3.00 |
| Sorbitol (%) | 3.00 | 3.00 | 3.00 | 3.00 | 3.00 | 3.00 | 3.00 | 3.00 | 3.00 |
| Mannitol (%) | | | | | | | | | |
| Xylitol (%) | | | | | | | | | |
| Triethanolamine (%) | | | | | | | | | |
| 3-Ethyl-3-hydroxymethyloxetane (%) | | | | | | | | | |
| Resin particle water dispersion liquid (%) | | | | | | | | | |
| Acetylenol E100 (%) | 0.50 | 0.50 | 0.50 | 0.50 | 0.50 | 0.50 | 0.50 | 0.50 | 0.50 |
| Sodium dodecyl sulfate (%) | | | | | | | | | |
| 2,4,7,9-Tetramethyldecane-4,7-diol (%) | | | | | | | | | |
| Ion-exchanged water (%) | rest | rest | rest | rest | rest | rest | rest | rest | rest |
| First organic monocarboxylic acid content $C_1$ (ppm) | 500 | 500 | 500 | 500 | 500 | 500 | 500 | 500 | 500 |
| Second organic monocarboxylic acid content $C_2$ (ppm) | 500 | 500 | 500 | 500 | 500 | 500 | 500 | 500 | 500 |
| Third organic monocarboxylic acid content $C_3$ (ppm) | 500 | 500 | 500 | 500 | 500 | 500 | 500 | 500 | 500 |

| | Example | | | | | | |
|---|---|---|---|---|---|---|---|
| | 27 | 28 | 29 | 30 | 31 | 32 | 33 |
| Silver particle dispersion liquid 1 (%) | 50.00 | 50.00 | 50.00 | 50.00 | 50.00 | 50.00 | 50.00 |
| Silver particle dispersion liquid 2 (%) | | | | | | | |
| Silver particle dispersion liquid 3 (%) | | | | | | | |
| Silver particle dispersion liquid 4 (%) | | | | | | | |
| Pigment dispersion liquid (%) | | | | | | | |
| Formic acid (ppm, 3.55) | 500 | 500 | 500 | 500 | 500 | 500 | 500 |
| Acetic acid (ppm, 4.56) | | | | | | | |
| Propionic acid (ppm, 4.67) | | | | | | | |
| Butyric acid (ppm, 4.63) | | | | | | | |
| 2-Methylpropionic acid (ppm, 4.63) | | | | | | | |
| Valeic acid (ppm, 4.64) | | | 500 | 500 | 500 | 500 | |
| 2,2-Dimethylpropionic acid (ppm, 4.90) | 500 | 500 | | | | | |
| Caproic acid (ppm, 4.63) | | | | | | | 8 |
| Enanthic acid (ppm, 4.66) | | | | | | | |
| Benzoic acid (ppm, 4.20) | | | | | | | |
| Oxalic acid (ppm, 1.04) | | | | | | | |
| Malonic acid (ppm, 2.65) | | | | | | | |
| Chloroacetic acid (ppm, 2.68) | | | | | | | |
| Methanesulfonic acid (ppm) | | | | | | | |
| 2-Hydroxybutyric acid (ppm) | | | | | | | |
| α-Oxobutyric acid (ppm) | | | | | | | |
| 2-Hydroxyvaleic acid (ppm) | | | | | | | |
| α-Oxovaleic acid (ppm) | | | | | | | |
| 2-Hydroxycaproic acid (ppm) | 500 | | 500 | 500 | 500 | 500 | |
| α-Oxocaproic acid (ppm) | | 500 | | | | | |
| 2-Hydroxyenanthic acid (ppm) | | | | | | | |
| Propylene glycol (%) | 6.00 | 6.00 | 6.00 | 6.00 | 6.00 | 6.00 | 6.00 |
| Glycerin (%) | 5.00 | 5.00 | 5.00 | 5.00 | 5.00 | 5.00 | 5.00 |
| 1,2-Hexanediol (%) | 3.00 | 3.00 | 3.00 | 3.00 | 3.00 | 3.00 | 3.00 |
| 1,6-Hexanediol (%) | 3.00 | 3.00 | 3.00 | 3.00 | 3.00 | 3.00 | 3.00 |

TABLE 2-continued

| Composition and characteristics of ink | | | | | | | | |
|---|---|---|---|---|---|---|---|---|
| Sorbitol (%) | | 3.00 | 3.00 | | | | 3.00 | |
| Mannitol (%) | | | | 3.00 | | | | |
| Xylitol (%) | | | | | 3.00 | | | |
| Triethanolamine (%) | | | | | | | | |
| 3-Ethyl-3-hydroxymethyloxetane (%) | | | | | | | | |
| Resin particle water dispersion liquid (%) | | | | | | | | |
| Acetylenol E100 (%) | | 0.50 | 0.50 | 0.50 | 0.50 | 0.50 | | |
| Sodium dodecyl sulfate (%) | | | | | | | 0.50 | 0.50 |
| 2,4,7,9-Tetramethyldecane-4,7-diol (%) | | | | | | | | |
| Ion-exchanged water (%) | | rest | rest | rest | rest | rest | rest | rest |
| First organic monocarboxylic acid content $C_1$(ppm) | | 500 | 500 | 500 | 500 | 500 | 500 | 8 |
| Second organic monocarboxylic acid content $C_2$(ppm) | | 500 | 500 | 500 | 500 | 500 | 500 | 500 |
| Third organic monocarboxylic acid content $C_3$(ppm) | | 500 | 500 | 500 | 500 | 500 | 500 | 0 |

TABLE 3

| Composition and characteristics of ink | | | | | | | | | |
|---|---|---|---|---|---|---|---|---|---|
| | Comparative example | | | | | | | | |
| | 1 | 2 | 3 | 4 | 5 | 6 | 7 | 8 | 9 |
| Silver particle dispersion liquid 1 (%) | 50.00 | 50.00 | 50.00 | 50.00 | 50.00 | 50.00 | 50.00 | 50.00 | 50.00 |
| Silver particle dispersion liquid 2 (%) | | | | | | | | | |
| Silver particle dispersion liquid 3 (%) | | | | | | | | | |
| Silver particle dispersion liquid 4 (%) | | | | | | | | | |
| Pigment dispersion liquid (%) | | | | | | | | | |
| Formic acid (ppm, 3.55) | | 1000 | 500 | 500 | 500 | 500 | 500 | 500 | |
| Acetic acid (ppm, 4.56) | | | 500 | | | | | | |
| Propionic acid (ppm, 4.67) | | | | | | | | | |
| Butyric acid (ppm, 4.63) | | | | | | | | | |
| 2-Methylpropionic acid (ppm, 4.63) | | | | | | | | | |
| Valeic acid (ppm, 4.64) | | | | | | | | 500 | |
| 2,2-Dimethylpropionic acid (ppm, 4.90) | | | | | | | | | |
| Caproic acid (ppm, 4.63) | | | | | | | | | |
| Enanthic acid (ppm, 4.66) | | | | | | | | | |
| Benzoic acid (ppm, 4.20) | | | | 500 | | | | | |
| Oxalic acid (ppm, 1.04) | | | | | 500 | | | | |
| Malonic acid (ppm, 2.65) | | | | | | 500 | | | |
| Chloroacetic acid (ppm, 2.68) | | | | | | | 500 | | |
| Methanesulfonic acid (ppm) | | | | | | | | 500 | |
| 2-Hydroxybutyric acid (ppm) | | | | | | | | | |
| α-Oxobutyric acid (ppm) | | | | | | | | | |
| 2-Hydroxyvaleic acid (ppm) | | | | | | | | | |
| α-Oxovaleic acid (ppm) | | | | | | | | | |
| 2-Hydroxycaproic acid (ppm) | | 500 | 500 | 500 | 500 | 500 | 500 | 500 | 500 |
| α-Oxocaproic acid (ppm) | | | | | | | | | |
| 2-Hydroxyenanthic acid (ppm) | | | | | | | | | |
| Propylene glycol (%) | 6.00 | 6.00 | 6.00 | 6.00 | 6.00 | 6.00 | 6.00 | 6.00 | 6.00 |
| Glycerin (%) | 5.00 | 5.00 | 5.00 | 5.00 | 5.00 | 5.00 | 5.00 | 5.00 | 5.00 |
| 1,2-Hexanediol (%) | 3.00 | 3.00 | 3.00 | 3.00 | 3.00 | 3.00 | 3.00 | 3.00 | 3.00 |
| 1,6-Hexanediol (%) | 3.00 | 3.00 | 3.00 | 3.00 | 3.00 | 3.00 | 3.00 | 3.00 | 3.00 |
| Sorbitol (%) | 3.00 | 3.00 | 3.00 | 3.00 | 3.00 | 3.00 | 3.00 | 3.00 | 3.00 |
| Mannitol (%) | | | | | | | | | |
| Xylitol (%) | | | | | | | | | |
| Triethanolamine (%) | | | | | | | | | |
| 3-Ethyl-3-hydroxymethyloxetane (%) | | | | | | | | | |
| Resin particle water dispersion liquid (%) | | | | | | | | | |
| Acetylenol E100 (%) | 0.50 | 0.50 | 0.50 | 0.50 | 0.50 | 0.50 | 0.50 | 0.50 | 0.50 |
| Sodium dodecyl sulfate (%) | | | | | | | | | |
| 2,4,7,9-Tetramethyldecane-4,7-diol (%) | | | | | | | | | |

TABLE 3-continued

| Composition and characteristics of ink | | | | | | | | | |
|---|---|---|---|---|---|---|---|---|---|
| Ion-exchanged water (%) | rest | rest | rest | rest | rest | rest | rest | rest | rest |
| First organic monocarboxylic acid content $C_1$(ppm) | 0 | 0 | 0 | 0 | 0 | 0 | 0 | 0 | 500 |
| Second organic monocarboxylic acid content $C_2$(ppm) | 0 | 1000 | 1000 | 500 | 500 | 500 | 500 | 500 | 0 |
| Third organic monocarboxylic acid content $C_3$(ppm) | 0 | 500 | 500 | 500 | 500 | 500 | 500 | 500 | 500 |

| | Comparative example | | | | | Reference example | |
|---|---|---|---|---|---|---|---|
| | 10 | 11 | 12 | 13 | 14 | 1 | 2 |
| Silver particle dispersion liquid 1 (%) | 50.00 | 50.00 | 50.00 | | | | |
| Silver particle dispersion liquid 2 (%) | | | | | | | |
| Silver particle dispersion liquid 3 (%) | | | | | | | |
| Silver particle dispersion liquid 4 (%) | | | | 33.40 | 33.40 | | |
| Pigment dispersion liquid (%) | | | | | | 50.00 | 50.00 |
| Formic acid (ppm, 3.55) | | | | | | 500 | |
| Acetic acid (ppm, 4.56) | | | 500 | | | | |
| Propionic acid (ppm, 4.67) | | | | | | 500 | |
| Butyric acid (ppm, 4.63) | | | | | | | |
| 2-Methylpropionic acid (ppm, 4.63) | | | | | | | |
| Valeic acid (ppm, 4.64) | | | | | | | |
| 2,2-Dimethylpropionic acid (ppm, 4.90) | | | | | | | |
| Caproic acid (ppm, 4.63) | | | | | | | |
| Enanthic acid (ppm, 4.66) | | | | | | | |
| Benzoic acid (ppm, 4.20) | | | | | | | |
| Oxalic acid (ppm, 1.04) | | | | | | | |
| Malonic acid (ppm, 2.65) | | | | | | | |
| Chloroacetic acid (ppm, 2.68) | | | | | | | |
| Methanesulfonic acid (ppm) | | | | | | | |
| 2-Hydroxybutyric acid (ppm) | | | | | | | |
| α-Oxobutyric acid (ppm) | | | | | | | |
| 2-Hydroxyvaleic acid (ppm) | | | | | | | |
| α-Oxovaleic acid (ppm) | | | | | | | |
| 2-Hydroxycaproic acid (ppm) | | | | | | 500 | |
| α-Oxocaproic acid (ppm) | | | | | | | |
| 2-Hydroxyenanthic acid (ppm) | | | | | | | |
| Propylene glycol (%) | 6.00 | | 18.00 | 26.00 | 26.00 | 6.00 | 6.00 |
| Glycerin (%) | 5.00 | 5.00 | | | | 5.00 | 5.00 |
| 1,2-Hexanediol (%) | 3.00 | 3.00 | | | | 3.00 | 3.00 |
| 1,6-Hexanediol (%) | 3.00 | | | | 3.00 | 3.00 | 3.00 |
| Sorbitol (%) | 3.00 | | | | | 3.00 | 3.00 |
| Mannitol (%) | | | | | | | |
| Xylitol (%) | | | | | | | |
| Triethanolamine (%) | 0.50 | 0.40 | | | | | |
| 3-Ethyl-3-hydroxymethyloxetane (%) | | | 8.00 | 15.00 | 15.00 | | |
| Resin particle water dispersion liquid (%) | | | | 0.30 | | | |
| Acetylenol E100 (%) | 0.50 | 0.50 | | | | 0.50 | 0.50 |
| Sodium dodecyl sulfate (%) | | | | | | | |
| 2,4,7,9-Tetramethyldecane-4,7-diol (%) | | | 0.50 | 0.50 | 0.50 | | |
| Ion-exchanged water (%) | rest | rest | rest | rest | rest | rest | rest |
| First organic monocarboxylic acid content $C_1$(ppm) | 0 | 0 | 0 | 2000 | 2000 | 500 | 0 |
| Second organic monocarboxylic acid content $C_2$(ppm) | 0 | 0 | 500 | 0 | 0 | 500 | 0 |
| Third organic monocarboxylic acid content $C_3$(ppm) | 0 | 0 | 0 | 0 | 0 | 500 | 0 |

Evaluation

Each ink prepared as described above was used, and the following evaluation was performed. In the present disclosure, regarding the evaluation criteria of each item, AA, A or B was assumed to be an acceptable level, and C was assumed to be an unacceptable level. The evaluation results are shown in Table 4.

Storage Stability

Regarding the ink obtained as described above, the volume-based cumulative 50% particle size ($D_1$) of the silver particle was measured. Thereafter, 100 g of the ink was placed in a closed polytetrafluoroethylene container having a volume of 180 mL, and the container was hermetically sealed and stored in an oven at a temperature of 60° C. for a month. Subsequently, the ink was taken out and was returned to 25° C. The volume-based cumulative 50% particle size ($D_2$) of the silver particle was measured. The rate of change of the particle size=$D_2/D_1$ (time) was determined, and storage stability was evaluated on the basis of the evaluation criteria described below.

AA: The rate of change of the particle size was less than 1.2 times.
A: The rate of change of the particle size was 1.2 or more times to less than 2.0 times.
B: The rate of change of the particle size was 2.0 or more times to less than 4.0 times.
C: The rate of change of the particle size was 4.0 or more times.

Abrasion Resistance

An ink cartridge was filled with each ink prepared as described above and set into an ink jet recording apparatus (trade name "PIXUS PRO 10-S" produced by CANON KABUSHIKI KAISHA) including a recording head that ejected an ink by the action of thermal energy. In the present example, a solid image (metallic image) recorded under the condition in which 8 ink droplets, about 3.8 ng each, were applied to a unit region (1 pixel) of 1/600 inch×1/600 inch was denoted as an image with a recording duty of 100%. A 2 cm×2 cm solid image with a recording duty of 100% was recorded on two sheets of recording medium (glossy paper, trade name "CANON Photo Paper.Glossy Pro (Platinum Grade) PT-201" produced by CANON KABUSHIKI KAISHA) having an ink-receiving layer. The ink-receiving layer of the recording medium contained chloride ions. After 5 minutes or 1 hour elapsed from recording, silbon paper was placed on the solid image, and a weight of 3.5 cm×3.5 cm was further placed thereon, and the silbon paper was pulled at a rate of 20 cm/sec while a pressure of 40 g/cm² was applied so as to rub the solid image against the silbon paper. Subsequently, the state of an ink stain transferred from the solid image to a non-recorded portion was visually inspected, and abrasion resistance was evaluated on the basis of the evaluation criteria described below. Meanwhile, regarding Reference examples 1 and 2 in which an ink not containing the silver particle was used, abrasion resistance was not evaluated.

A: According to evaluation after 5 minutes, no ink stain was observed.
B: According to evaluation after 1 hour, no ink stain was observed, but according to evaluation after 5 minutes, an ink stain was observed.
C: According to evaluation after 1 hour, an ink stain was observed.

TABLE 4

| | | Evaluation result | |
|---|---|---|---|
| | | Abrasion resistance | Storage stability |
| Example | 1 | A | AA |
| | 2 | A | AA |
| | 3 | A | AA |
| | 4 | A | AA |
| | 5 | A | AA |
| | 6 | A | AA |
| | 7 | B | A |
| | 8 | A | AA |
| | 9 | A | AA |
| | 10 | A | AA |
| | 11 | A | A |
| | 12 | A | A |
| | 13 | A | AA |
| | 14 | A | B |
| | 15 | A | AA |
| | 16 | A | B |
| | 17 | A | AA |
| | 18 | A | AA |
| | 19 | A | AA |
| | 20 | A | AA |
| | 21 | A | AA |
| | 22 | A | AA |
| | 23 | A | AA |
| | 24 | A | AA |
| | 25 | A | AA |
| | 26 | A | AA |
| | 27 | A | AA |
| | 28 | A | AA |
| | 29 | A | AA |
| | 30 | A | AA |
| | 31 | B | AA |
| | 32 | A | A |
| | 33 | B | B |
| Comparative example | 1 | C | C |
| | 2 | C | B |
| | 3 | C | B |
| | 4 | C | B |
| | 5 | C | B |
| | 6 | C | B |
| | 7 | C | B |
| | 8 | C | B |
| | 9 | C | A |
| | 10 | C | AA |
| | 11 | C | AA |
| | 12 | C | B |
| | 13 | C | A |
| | 14 | C | A |
| Reference example | 1 | — | AA |
| | 2 | — | AA |

The present disclosure provides an aqueous ink enabling a metallic image having abrasion resistance that is realized after application of the ink to be recorded in a short time and having excellent storage stability. In addition, the present disclosure provides an ink cartridge using the aqueous ink and provides an ink jet recording method.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-237558, filed Dec. 26, 2019, No. 2019-237559 filed Dec. 26, 2019, and No. 2020-204754 filed Dec. 10, 2020 which are hereby incorporated by reference herein in their entirety.

What is claimed is:

1. An ink jet recording method, comprising:
recording an image on a recording medium having an ink-receiving layer including a halide ion and a cationic compound by ejecting an ink from an ink jet-type recording head,
wherein the ink comprises an aqueous ink comprising a silver particle, (i) a first organic monocarboxylic acid having a pKa of 4.60 or more, (ii) a second organic monocarboxylic acid having a pKa of less than 4.60 and having a carbon number of 2 or less, and (iii) a third organic monocarboxylic acid that has a carbon number of 6 or less and is at least one acid selected from the group consisting of an organic 2-hydroxymonocarboxylic acid and an organic α-oxomonocarboxylic acid wherein the carbon number $N_1$ of the first organic monocarboxylic acid and the carbon number $N_2$ of the third organic monocarboxylic acid satisfies $N_1+1=N_2$, and wherein the third organic monocarboxylic acid differs from both of the first organic monocarboxylic acid and the second organic monocarboxylic acid.

2. The ink jet recording method according to claim 1, wherein the content (ppm) of the first organic monocarboxylic acid is 10 ppm or more based on a total mass of the aqueous ink.

3. The ink jet recording method according to claim 1, wherein the carbon number of the first organic monocarboxylic acid is 5 or less.

4. The ink jet recording method according to claim 1, wherein the ink further comprises:
a penta- or higher-valent sugar alcohol.

5. The ink jet recording method according to claim 1, wherein the ink further comprises:
a surfactant having an ethylene oxide group.

6. The ink jet recording method according to claim 1, wherein the content of the first organic monocarboxylic acid is 8,000 ppm or less based on a total mass of the aqueous ink.

7. The ink jet recording method according to claim 1, wherein the content of the second organic monocarboxylic acid is 10 ppm or more to 8,000 ppm or less based on a total mass of the ink.

8. The ink jet recording method according to claim 1, wherein the content of the third organic monocarboxylic acid is 10 ppm or more to 8,000 ppm or less based on a total mass of the ink.

9. The ink jet recording method according to claim 1, wherein the mass ratio of the content (ppm) of the second organic monocarboxylic acid is 0.10 times or more to 5.00 times or less to the content (ppm) of the first organic monocarboxylic acid.

10. The ink jet recording method according to claim 1, wherein the mass ratio of the content (ppm) of the third organic monocarboxylic acid is 0.10 times or more to 10.00 times or less to the content (ppm) of the first organic monocarboxylic acid.

11. The ink jet recording method according to claim 4, wherein the content of the penta- or higher-valent sugar alcohol is 0.10% by mass or more to 10.00% by mass or less based on a total mass of the ink.

12. The ink jet recording method according to claim 4, wherein the mass ratio of the content (% by mass) of the penta- or higher-valent sugar alcohol is 0.50 times or more to 5.00 times or less to the content (% by mass) of the silver particle.

13. The ink jet recording method according to claim 1, wherein the first organic monocarboxylic acid is at least one acid selected from the group consisting of propionic acid, butyric acid, 2-methylpropionic acid, valeric acid, 2,2-dimethylpropionic acid, caproic acid and enanthic acid.

14. The ink jet recording method according to claim 1, wherein the second organic monocarboxylic acid is at least one acid selected from the group consisting of formic acid and acetic acid.

15. The ink jet recording method according to claim 1, wherein the third organic monocarboxylic acid is at least one acid selected from the group consisting of 2-hydroxybutyric acid, 2-hydroxyvaleric acid, 2-hydroxycaproic acid, α-oxobutyric acid, α-oxovaleric acid and α-oxocaproic acid.

16. The ink jet recording method according to claim 1, wherein the first organic monocarboxylic acid comprises valeric acid and the second organic monocarboxylic acid comprises formic acid.

17. The ink jet recording method according to claim 4, wherein the penta- or higher-valent sugar alcohol is at least one alcohol selected from the group consisting of xylitol, ribitol, sorbitol, mannitol and maltitol.

18. The ink jet recording method according to claim 1, wherein the ink further comprises: an α,β-alkanediol and an α,ω-alkanediol.

19. The ink jet recording method according to claim 1,
wherein the first organic monocarboxylic acid is at least one acid selected from the group consisting of propionic acid, valeric acid, butyric acid, 2-methylpropionic acid, and 2,2-dimethylpropionic acid,
wherein the second organic monocarboxylic acid is at least one acid selected from the group consisting of formic acid and acetic acid, and
wherein the third organic monocarboxylic acid is at least one acid selected from the group consisting of 2-hydroxybutyric acid, α-oxobutyric acid, 2-hydroxycaproic acid, α-oxocaproic acid, 2-hydroxyvaleric acid, and α-oxovalericacid.

* * * * *